Sept. 8, 1959 D. C. LIVINGSTON 2,903,506
COLOR TELEVISION SIGNAL GENERATOR
Filed Aug. 26, 1952
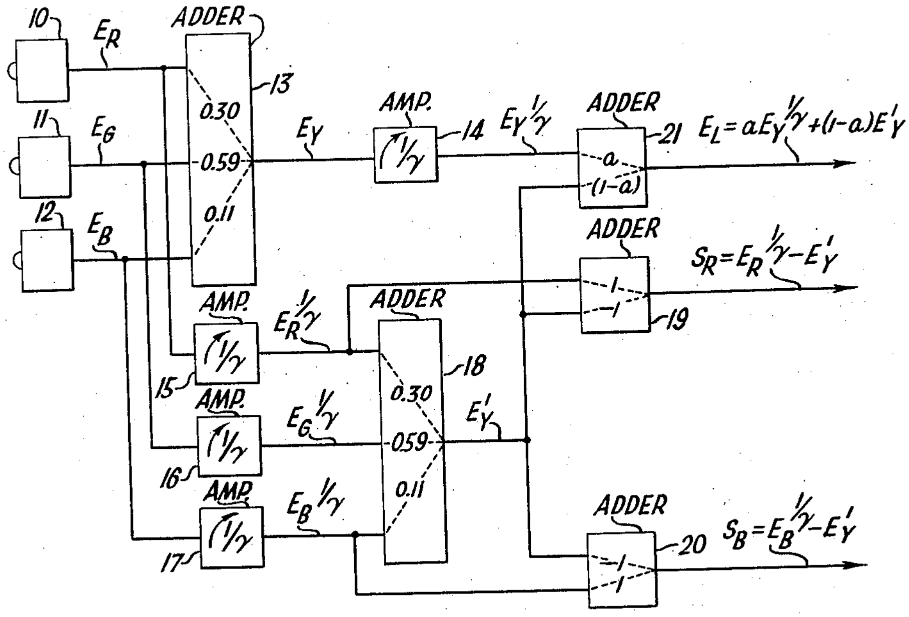
INVENTOR
DONALD C. LIVINGSTON
BY John A. Harvey
ATTORNEY 2,903,506
Patented Sept. 8, 1959

1

2,903,506

COLOR TELEVISION SIGNAL GENERATOR

Donald C. Livingston, Bayside, N.Y., assignor, by mesne assignments, to Sylvania Electric Products Inc., Wilmington, Del., a corporation of Delaware Application August 26, 1952, Serial No. 306,450
5 Claims. (Cl. 178—5.4)

The present invention relates to color-television signal generators, and particularly to a generator for developing gamma-corrected chrominance and luminance color television signals.

One form of color television system heretofore proposed develops three color signals representative of individual ones of three color images to be transmitted and adds the three signals in proportionate parts to provide a signal representative of the luminance of the television image to be translated. This luminance signal is reversed in phase and then added to the red and blue color signals to provide two chrominance signals which are related to the respective red and blue color images to be transmitted. The luminance and chrominance signals are transmitted to the receiving apparatus which derives and applies to an image reproducing device three signals corresponding to the three color signals originally developed. If the reproducing device produced a luminance output linearly related to the amplitudes of the color signals applied thereto, the reproduced image would faithfully conform in chromaticity and brightness to the corresponding chromaticity and brightness of the original image. Presently-known reproducing devices do not however, have such linear relationship but rather develop a luminance output which varies according to some power of the applied color-signal voltage. The exponent defining the extent of this nonlinearity is the "gamma" of the reproducing device and unless this nonlinearity is compensated elsewhere in the system it undesirably affects the relationship between the brightness of the image to be transmitted and the brightness of the image as reproduced.

To avoid the effect of such nonlinearity, it has been proposed that each of the color-image signals be amplitude corrected either at the source of the signals or a point immediately preceding the image reproducing device. Since the source ordinarily will supply color television signals to many receivers, it is economically preferable to make the desired gamma correction at the source. To this end, it has been proposed that each color signal be translated through an amplifier having a power-law input-output amplitude characteristic with exponent proportional to the reciprocal of the gamma exhibited by the color image reproducing device. While this reduces the chromaticity distortion which would otherwise be caused by the gamma of the reproducing device, this proposed method of gamma correction has several important disadvantages.

The disadvantages presently to be discussed are of particular importance in the constant-luminance form of television signal which is a desirable form for many reasons. A true constant-luminance system is one in which all of the luminance information is supplied by the luminance signal, the chrominance signals being incapable of affecting the luminance of the reproduced image. With the form of gamma correction last described, constant luminance as related to color television image reproduction fails in the vicinity of saturated primary colors. That is, all of the luminance information is not supplied by the luminance signal alone but is partially supplied by the chrominance signals especially when the transmitted color images correspond to saturated primary colors. This is most apparent in the presence of interference or noise which causes conspicuous flashes and streaks of color to appear on the reproduced image.

2

Another disadvantage of the form of gamma correction above described is related to the fact that it is desirable that the color television signal be compatible with a monochrome signal so that it may be reproduced with fidelity of detail by the monochrome receiver. The luminance fidelity for monochrome reproduction varies, with the form of gamma correction above described, with color content of the transmitted image and is particularly bad when the color images are near saturated primary colors.

It is an object of the present invention to provide a new and improved color-television signal generator which avoids one or more of the disadvantages and limitations of prior such generators.

It is a further object of the invention to provide a novel color-television signal generator suitable for use in a constant-luminance type of television system and one having substantially improved luminance fidelity when the color signals are reproduced as a color television image.

It is an additional object of the invention to provide a novel color-television signal generator having exceptionally high luminance fidelity when the color television signals are reproduced in monochrome and particularly when the color images have hues near saturated primary colors.

For a better understanding of the present invention, together with other and further objects thereof, reference is had to the following description taken in connection with the accompanying drawing, and its scope will be pointed out in the appended claims.

Referring now to the drawing, the single figure thereof is a circuit diagram representing a color-television signal generator embodying the present invention. The signal generator includes means for developing three signals representative of individual ones of three color images to be transmitted, and particularly signals having amplitudes each varying directly proportionately to the brightness of an individual one of the color images. This means is shown as comprised by a plurality of cameras 10, 11 and 12 which respectively develop the red image signal $E_R$, the green image signal $E_G$, and the blue image signal $E_B$. These image signals are applied to an adder 13 wherein they are added in preselected proportionate parts to provide a composite signal $E_Y$ mathematically defined by the relation:

$$E_Y = 0.30\ E_R + 0.59\ E_G + 0.11\ E_B$$

The composite signal is applied to an amplifier 14 which has a preselected nonlinear input-output amplitude translation characteristic over its operating amplitude range and in particular has a power-law input-output amplitude characteristic proportional to the reciprocal of the gamma of the color reproducing device. There is thus developed in the output circuit of the amplifier 14 a signal which may be expressed mathematically by the relation:

$$E_Y^{1/\gamma} = (0.30\ E_R + 0.59\ E_G + 0.11\ E_B)^{1/\gamma}$$

The three television image signals developed by the cameras 10, 11 and 12 are also applied to respective amplifiers 15, 16 and 17 which have power-law amplitude translation characteristics corresponding to that of the and which develop a plurality of amplitude-modified color amplifier 14 and which develop a plurality of amplitude-modified color signals $E_R^{1/\gamma}$, $E_G^{1/\gamma}$, and $E_B^{1/\gamma}$. These three amplitude-modified color signals are applied to an adder 18 which is similar to the adder 13 and adds the applied signals in the same preselected proportionate parts to provide a composite amplitude-modified signal $E'_Y$ which is mathematically defined by the relation:

$$E'_Y=0.30\ E_R^{1/\gamma}+0.59\ E_G^{1/\gamma}+0.11\ E_B^{1/\gamma}$$

This composite amplitude-modified signal is applied to an adder 19 where its phase is inverted and it is added in equal proportions with the amplitude-modified signal developed in the output circuit of the amplifier 15. The composite signal developed by the adder 18 is also applied to an adder 20 where its phase also is inverted and it is added to the signal developed in the output circuit of the amplifier 17. There is developed in the output circuit of the adder 19 a red chrominance signal which may be mathematically expressed by the relation:

$$S_R=E_R^{1/\gamma}-E'_Y$$

and in the output circuit of the adder 20 a blue chrominance signal which may be mathematically defined by the equation:

$$S_B=E_B^{1/\gamma}-E'_Y$$

The composite signal developed in the output circuit of the adder 18 is also applied to an adder 21 which has a translation characteristic $a$ having a value greater than zero but less than or equal to unity. As indicated in Fig. 1, the adder 21 modifies the amplitude of the composite signal developed in the output circuit of the amplifier 14 by the factor $a$ and also modifies the composite signal developed in the output circuit of the adder 18 by the factor $1-a$ and thereafter combines these modified signals to provide a luminance signal $E_L$ which may be mathematically defined by the relation:

$$E_L=aE_Y^{1/\gamma}+(1-a)\ E'_Y$$

The luminance signal $E_L$ and the red and blue chrominance signals $S_R$ and $S_B$ may be supplied directly to a color receiver for reproduction or, as is more usual, may be used to modulate a television carrier and subcarrier signals in the manner described in a paper by C. I. Hirsch, W. F. Bailey and B. D. Loughlin entitled "Principles of NTSC Compatible Color Television," which appears in the February 1952 issue of Electronics, pages 88–95 (Fig. 5, page 89). A suitable color television receiver for use with a carrier-modulated signal as last mentioned is shown as Fig. 7, page 90, of this paper.

The color television signal generator just described provides gamma correction of both the luminance signal and the chrominance signals. It has been found that this novel form of gamma correction completely avoids any loss of luminance fidelity for monochrome reproduction of color television signals even when the color-image signals represent saturated primary color images. This is particularly true when the translation constant $a$ of the adder 21 has the value of unity, and for this value of $a$ the constant-luminance adherence for reproduction in color is very substantially improved particularly when the color images represent near-saturated primary colors. For values of $a$ less than unity but greater than zero, the luminance fidelity for monochrome reproduction is slightly impaired and the constant-luminance adherence not quite as good, but chromatic distortion is somewhat improved over that when $a$ has the value unity. Even here, however, any chromatic distortion appearing when $a$ has the value unity is primarily in the direction of the blue primary color but these are precisely the areas in which the human eye is least able to discern distortion toward blue and thus would tend to be quite inconspicuous in color television display.

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A color-television signal generator comprising, means for developing a plurality of individual color signals having amplitudes each varying directly proportional to brightness of an individual one of a plurality of color images to be transmitted, means for adding preselected proportionate parts of the amplitude of each of said signals to provide a composite signal, said proportionate parts being substantially equal to the percentage contribution of each of said signals to the luminance of a given standard white, means having a preselected nonlinear input-output amplitude translation characteristic over its operating amplitude range for translating said composite signal to provide a luminance signal, means having power-law translation characteristic for translating each of said color signals to develop a plurality of amplitude-modified color signals, means for adding preselected proportionate parts of said amplitude-modified color signals to provide a composite amplitude-modified signal, and means for combining said composite amplitude-modified signal with each of preselected ones of said amplitude-modified color signals to provide a plurality of chrominance signals.

2. A color-television signal generator comprising, means for developing a plurality of individual color signals having amplitudes each varying directly proportional to the brightness of an individual one of a plurality of color images to be transmitted, means for adding preselected proportionate parts of the amplitude of each of said signals to provide a composite signal, said proportionate parts being substantially equal to the percentage contribution of each of said signals to the luminance of a given standard white, a signal amplifier having a power-law input-output amplitude characteristic for amplifying said composite signal to provide a luminance signal, means having a power-law amplitude translation characteristic for translating each of said color signals to develop a plurality of amplitude-modified color signals, means for adding preselected proportionate parts of said amplitude-modified color signals to provide a composite amplitude-modified signal, and means for combining said composite amplitude-modified signal with each of preselected ones of said amplitude-modified color signals to provide a plurality of chrominance signals.

3. A color-television signal generator comprising, means for developing a plurality of individual color signals having amplitudes each varying directly proportional to the brightness of an individual one of a plurality of color images to be transmitted, means for adding preselected proportionate parts of the amplitude of each of said signals to provide a composite signal, said proportionate parts being substantially equal to the percentage contribution of each of said signals to the luminance of a given standard white, translating means having a power-law input-output amplitude translation characteristic proportional to the reciprocal of a preselected gamma factor for translating said composite signal to provide a luminance signal, means having a power-law amplitude translation characteristic proportional to the reciprocal of said preselected gamma factor for translating each of said color signals to develop a plurality of amplitude-modified color signals, means for adding preselected proportionate parts of said amplitude-modified color signals to provide a composite amplitude-modified signal, and means for combining said composite amplitude-modified signal with each of preselected ones of said amplitude-modified color signals to provide a plurality of chrominance signals.

4. A color-television signal generator comprising, means for developing a plurality of individual color signals having amplitudes each varying directly proportional to the brightness of an individual one of a plurality of color images to be transmitted, means for adding preselected proportionate parts of the amplitude of each of said signals to provide a composite signal, said proportionate parts being substantially equal to the percentage contribution of each of said signals to the luminance of a given standard white, a signal amplifier having a power-law input-output amplitude characteristic for amplifying said composite signal, means having a power-law amplitude translation characteristic for translating each of said color signals to develop a plurality of amplitude-modified color signals, means for adding preselected proportionate parts of said amplitude-modified color signals to provide a composite amplitude-modified signal, and means for combining said translated composite signal with a proportionate part of said composite amplitude-modified signal to provide a luminance signal.

5. A color-television signal generator comprising, means for developing a plurality of individual color signals having amplitudes each varying directly proportional to the brightness of an individual one of a plurality of color images to be transmitted, means for adding preselected proportionate parts of the amplitude of each of said signals to provide a composite signal, said proportionate parts being substantially equal to the percentage contribution of each of said signals to the luminance of a given standard white, an amplifier having a power-law input-output amplitude characteristic proportional to the reciprocal of a preselected gamma factor for translating said composite signal, means having a power-law amplitude translation characteristic proportional to the reciprocal of said preselected gamma factor for translating each of said color signals to develop a plurality of amplitude-modified color signals, means for adding preselected proportionate parts of said amplitude-modified color signals to provide a composite amplitude-modified color signal, and means for combining said translated composite signal with a proportional part of said composite amplitude-modified signal to provide a luminance signal.

References Cited in the file of this patent

UNITED STATES PATENTS

| | | |
|---|---|---|
| 2,634,324 | Bedford | Apr. 7, 1953 |
| 2,651,673 | Fredendall | Sept. 8, 1953 |
| 2,773,929 | Loughlin | Dec. 11, 1956 |

OTHER REFERENCES

Principles of N.T.S.C. Compatible Color Television, Electronics, Feb. 5, 1952, page 91.

UNITED STATES PATENT OFFICE

CERTIFICATE OF CORRECTION

Patent No. 2,903,506 September 8, 1959

Donald C. Livingston

It is hereby certified that error appears in the printed specification of the above numbered patent requiring correction and that the said Letters Patent should read as corrected below.

Column 2, line 67, strike out "and which develop a plurality of amplitude-modified color".

Signed and sealed this 26th day of January 1960.

(SEAL)

Attest:

KARL H. AXLINE

Attesting Officer

ROBERT C. WATSON

Commissioner of Patents